United States Patent
Shibata et al.

(10) Patent No.: US 12,258,431 B2
(45) Date of Patent: Mar. 25, 2025

(54) TRANSPARENT THERMOPLASTIC RESIN COMPOSITION AND ARTICLE MOLDED THEREOF

(71) Applicant: Toray Industries, Inc., Tokyo (JP)

(72) Inventors: Takuya Shibata, Ichihara (JP); Takanori Suga, Ichihara (JP); Takayuki Hase, Ichihara (JP)

(73) Assignee: Toray Industries, Inc., Tokyo (JP)

( * ) Notice: Subject to any disclaimer, the term of this patent is extended or adjusted under 35 U.S.C. 154(b) by 746 days.

(21) Appl. No.: 17/626,366

(22) PCT Filed: May 22, 2020

(86) PCT No.: PCT/JP2020/020263
§ 371 (c)(1),
(2) Date: Jan. 11, 2022

(87) PCT Pub. No.: WO2021/014735
PCT Pub. Date: Jan. 28, 2021

(65) Prior Publication Data
US 2022/0259359 A1    Aug. 18, 2022

(30) Foreign Application Priority Data
Jul. 19, 2019    (JP) .................. 2019-133845

(51) Int. Cl.
C08F 279/06    (2006.01)
C08L 25/12    (2006.01)
(Continued)

(52) U.S. Cl.
CPC ............ *C08F 279/06* (2013.01); *C08L 25/12* (2013.01); *C08L 25/14* (2013.01); *C08L 83/04* (2013.01);
(Continued)

(58) Field of Classification Search
CPC .......... C08L 33/12; C08L 51/04; C08L 83/04; C08L 51/085; C08F 279/02; C08F 212/08; C08F 220/44; C08F 220/14
See application file for complete search history.

(56) References Cited

U.S. PATENT DOCUMENTS

2017/0137620 A1* 5/2017 Iwanaga ............. C08F 283/124

FOREIGN PATENT DOCUMENTS

| JP | 47-36253 | 9/1972 |
| JP | 2-292351 | 12/1990 |

(Continued)

*Primary Examiner* — Eli D. Strah
(74) *Attorney, Agent, or Firm* — DLA Piper LLP (US)

(57) ABSTRACT

A transparent thermoplastic resin composition includes: 100 parts by mass of a transparent thermoplastic resin composition composed of 10 to 60 parts by mass of a graft copolymer (A) obtained by graft-copolymerizing a monomer mixture (a) containing at least an aromatic vinyl-based monomer (a1) and a (meth)acrylic acid ester-based monomer (a2) in the presence of a rubbery polymer (r), and 40 to 90 parts by mass of a vinyl-based copolymer (B) obtained by copolymerizing a monomer mixture (b) containing at least an aromatic vinyl-based monomer (b1), a (meth)acrylic acid ester-based monomer (b2), and a vinyl cyanide-based monomer (b3); and 15 ppm or more and 40 ppm or less of a polydimethyl siloxane gum (C) having a weight-average molecular weight of 300,000 or more.

7 Claims, 4 Drawing Sheets

(51) Int. Cl.
  *C08L 25/14*    (2006.01)
  *C08L 83/04*    (2006.01)
(52) U.S. Cl.
  CPC ....... *C08L 2201/10* (2013.01); *C08L 2203/30* (2013.01); *C08L 2205/03* (2013.01)

(56) References Cited

FOREIGN PATENT DOCUMENTS

| | | | |
|---|---|---|---|
| JP | 10-204251 | 8/1998 | |
| JP | 2001-288327 | 10/2001 | |
| JP | 2004-300209 | 10/2004 | |
| JP | 4534075 B2 * | 9/2010 | ............... C08K 5/10 |
| JP | 2012-072203 | 4/2012 | |
| WO | 03/102076 | 12/2003 | |

\* cited by examiner

TRANSPARENT THERMOPLASTIC RESIN COMPOSITION AND ARTICLE MOLDED THEREOF

TECHNICAL FIELD

This disclosure relates to a transparent thermoplastic resin composition having excellent impact resistance and flowability, also having a high transparency and good color tone, and further having good mold deposition.

BACKGROUND

There is a known transparent ABS resin containing a graft copolymer obtained by copolymerizing, with a rubbery polymer such as a diene-based rubber, (i) an aromatic vinyl compound such as styrene or α-methylstyrene, (ii) a vinyl cyanide compound such as acrylonitrile or methacrylonitrile, and (iii) an unsaturated alkyl carboxylate compound such as methyl methacrylate or methyl acrylate. This transparent ABS resin is excellent in terms of (i) transparency, (ii) a mechanical strength balance among impact resistance, stiffness and the like, (iii) flowability, and (iiii) mold deposition, cost-effectiveness and the like, and thus, is widely utilized in applications such as home electric appliances, communication devices, general merchandise, and medical devices.

JP 2001-288327A discloses a technique of allowing a thermoplastic resin composition to develop impact resistance, slidability, moldability, and contamination resistance, wherein the thermoplastic resin composition is characterized by containing (a) 100 parts by mass of an (A) component composed of a graft copolymer as a disperse phase and a matrix resin as a continuous phase, and 1 to 5 parts by mass of a (B) component that is an organosiloxane compound having a weight-average molecular weight of 500,000 or more.

Methods proposed as a technique of allowing a transparent thermoplastic resin composition to develop transparency and impact resistance are as below-mentioned. For example, WO 2003/102076 discloses a transparent thermoplastic resin composition characterized by containing 1 ppm or more and less than 100 ppm of silicon atoms (B) in 100 parts by weight of a rubber reinforced styrene-based resin (A) composed of a graft copolymer (a-1) and a copolymer (a-2). JP 2004-300209A discloses a thermoplastic resin composition characterized by containing a rubber-modified styrene-based resin composition containing (I) a continuous phase of a styrene-(meth)acrylic acid ester-based copolymer and (II) a disperse phase of a graft copolymer in which a styrene-(meth)acrylic acid ester-based copolymer is grafted, wherein the thermoplastic resin composition contains 100 parts by mass of the rubber-modified styrene-based resin composition and 0.005 to 0.05 part by mass of an organic polysiloxane.

However, the above-mentioned techniques have an insufficient balance among transparency, impact resistance, flowability, and mold deposition, and thus, are limited for use in a wide range of applications in some instances.

It could therefore be helpful to provide a transparent thermoplastic resin composition having excellent impact resistance and flowability, also having a high transparency and good color tone, and further having good mold deposition.

SUMMARY

We discovered that a transparent thermoplastic resin composition having excellent impact resistance and flowability, also having a high transparency and good color tone, and further having good mold deposition is obtained by blending a transparent thermoplastic resin composition and a specific amount of polydimethyl siloxane having a specific viscosity, in which transparent thermoplastic resin composition, a rubbery-polymer-containing graft copolymer is dispersed in a vinyl-based copolymer obtained by copolymerizing a vinyl-based monomer mixture.

We thus provide:

(1) A transparent thermoplastic resin composition including: 100 parts by mass of a transparent thermoplastic resin composition composed of 10 to 60 parts by mass of a graft copolymer (A) obtained by graft-copolymerizing a monomer mixture (a) containing at least an aromatic vinyl-based monomer (a1) and a (meth)acrylic acid ester-based monomer (a2) in the presence of a rubbery polymer (r), and 40 to 90 parts by mass of a vinyl-based copolymer (B) obtained by copolymerizing a monomer mixture (b) containing at least an aromatic vinyl-based monomer (b1), a (meth)acrylic acid ester-based monomer (b2), and a vinyl cyanide-based monomer (b3); and 15 ppm or more and 40 ppm or less of a polydimethyl siloxane gum (C) having a weight-average molecular weight of 300,000 or more.

(2) The transparent thermoplastic resin composition according to (1), wherein the rubbery polymer (r) is polybutadiene.

(3) The transparent thermoplastic resin composition according to (1) or (2), wherein the rubbery polymer (r) has a mass-average particle diameter of 0.15 to 0.4 μm.

(4) A method of producing a transparent thermoplastic resin composition including the steps of: obtaining a graft copolymer (A) by graft-copolymerizing a monomer mixture (a) containing at least an aromatic vinyl-based monomer (a1) and a (meth)acrylic acid ester-based monomer (a2) in the presence of a rubbery polymer (r); obtaining a vinyl-based copolymer (B) by copolymerizing a monomer mixture (b) containing at least an aromatic vinyl-based monomer (b1), a (meth)acrylic acid ester-based monomer (b2), and a vinyl cyanide-based monomer (b3); and mixing at least the graft copolymer (A), the vinyl-based copolymer (B), and a polydimethyl siloxane gum (C) having a weight-average molecular weight of 300,000 or more; wherein the transparent thermoplastic resin composition contains: 100 parts by mass of a transparent thermoplastic resin composition composed of 10 to 60 parts by mass of the graft copolymer (A) and 40 to 90 parts by mass of the vinyl-based copolymer (B); and 15 ppm or more and 40 ppm or less of the polydimethyl siloxane gum (C).

(5) A method of producing a transparent thermoplastic resin composition, comprising the steps of: obtaining a polydimethyl siloxane gum (C)-containing graft copolymer (A') by graft-copolymerizing a monomer mixture (a) containing at least an aromatic vinyl-based monomer (a1) and a (meth)acrylic acid ester-based monomer (a2) in the presence of a rubbery polymer (r) and a polydimethyl siloxane gum (C) having a weight-average molecular weight of 300,000 or more; obtaining a vinyl-based copolymer (B) by copolymerizing a monomer mixture (b) containing at least an aromatic vinyl-based monomer (b1), a (meth)acrylic acid ester-based monomer (b2), and a vinyl cyanide-based monomer (b3); and mixing at least the polydimethyl siloxane gum (C)-containing graft copolymer (A') and the vinyl-based copolymer (B); wherein the transparent thermoplastic resin composition includes 15 ppm or more and 40 ppm or less of the polydimethyl siloxane gum (C) with respect to 100 parts by mass of a transparent thermoplastic resin composition composed of 10 to 60 parts by mass of the graft copolymer (A) contained in the polydimethyl siloxane gum (C)-containing graft copolymer (A') and 40 to 90 parts by mass of the vinyl-based copolymer (B).

(6) A molded article composed of the transparent thermoplastic resin composition according to any one of (1) to (3).

(7) A method of producing a molded article, including: producing a transparent thermoplastic resin composition by the production method according to (4) or (5); and then molding the resulting transparent thermoplastic resin composition.

We make it possible to obtain a transparent thermoplastic resin composition having excellent impact resistance and flowability, also having a high transparency and good color tone, and further having good mold deposition.

REFERENCE SIGNS LIST

Figure 1:
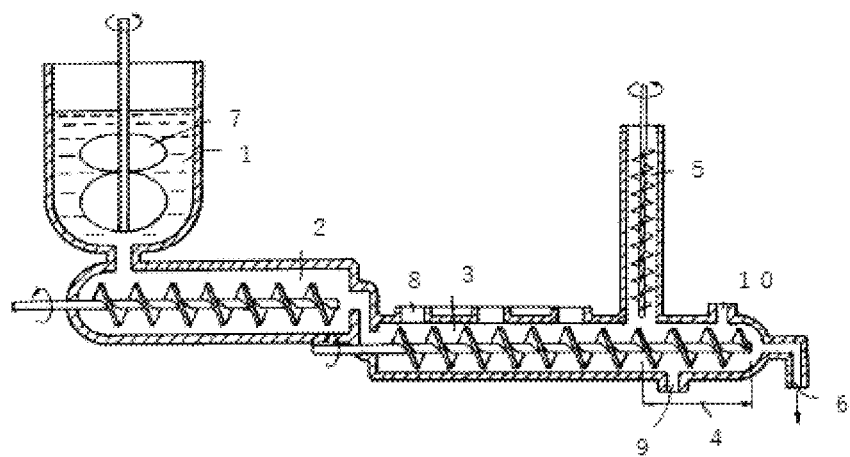
FIG. 1 is a schematic diagram of one example of a production apparatus for a transparent thermoplastic resin composition.

1 . . . Reactor
2 . . . Preheater
3 . . . Twin Screw Extruder-type Devolatilizer
4 . . . Melt Kneading Zone
5 . . . Twin Screw Extruder-type Feeder
6 . . . Discharge Hole
7 . . . Agitator (Helical Ribbon Impeller)
8 . . . Vent Port
9 . . . Water Inlet
10 . . . Final Vent Port

DETAILED DESCRIPTION

Our transparent thermoplastic resin composition is obtained by blending the below-mentioned graft copolymer (A) with the below-mentioned vinyl-based copolymer (B), and further contains a specific polydimethyl siloxane gum (C) in a specific amount. Blending in the graft copolymer (A) makes it possible to enhance the moldability of the transparent thermoplastic resin composition and enhance the impact resistance, transparency, and color tone of the molded article. In addition, blending in the vinyl-based copolymer (B) makes it possible to enhance the moldability of the transparent thermoplastic resin composition and enhance the transparency and color tone of the molded article. Furthermore, containing the specific polydimethyl siloxane gum (C) in a specific amount makes it possible to enhance the impact resistance of the molded article, and, in particular, using a polydimethyl siloxane gum having a specific viscosity makes it possible to enhance the flowability and mold deposition of the transparent thermoplastic resin composition.

The graft copolymer (A) constituting a transparent thermoplastic resin composition may be obtained by graft-copolymerizing a monomer mixture (a) containing at least an aromatic vinyl-based monomer (a1) and a (meth)acrylic acid ester-based monomer (a2) in the presence of a rubbery polymer (r). That is, the graft copolymer (A) is a copolymer in which the monomer mixture (a) containing at least the aromatic vinyl-based monomer (a1) and the (meth)acrylic acid ester-based monomer (a2) is graft-copolymerized with the rubbery polymer (r). The monomer mixture (a) may further contain another monomer that can be copolymerized with the below-mentioned (a1) to (a2).

Examples of rubbery polymers (r) include polybutadiene, poly(butadiene-styrene) (SBR), poly(butadiene-butyl acrylate), poly(butadiene-methyl methacrylate), poly(butyl acrylate-methyl methacrylate), poly(butadiene-ethyl acrylate), natural rubber and the like. Two or more of these materials may be used as the rubbery polymer (r). Among the rubbery polymers (r), polybutadiene, SBR, and natural rubber are preferable from the viewpoint of further enhancing the impact resistance, transparency, and color tone of the molded article, and polybutadiene is most preferable.

The amount of the rubbery polymer (r) in the graft copolymer (A) is preferably 20 mass % or more and 80 mass % or less with respect to the total amount of the rubbery polymer (r) and the vinyl-based monomer mixture (a) that constitute the graft copolymer (A). Containing 20 mass % or more of the rubbery polymer (r) makes it possible to further enhance the impact resistance of the molded article. The amount of the rubbery polymer (r) is more preferably 35 mass % or more. On the other hand, containing 80 mass % or less of the rubbery polymer (r) makes it possible to further enhance the flowability of the transparent thermoplastic resin composition and the impact resistance and transparency of the molded article. The amount of the rubbery polymer (r) is more preferably 60 mass % or less.

The rubbery polymer (r) preferably has a mass-average particle diameter of 0.15 µm or more, more preferably 0.25 µm or more, and the upper limit is preferably 0.4 µm or less, more preferably 0.35 µm or less. Allowing the rubbery polymer (r) to have a mass-average particle diameter of 0.15 µm or more makes it possible to inhibit the impact resistance of the molded article from decreasing. In addition, allowing the rubbery polymer (r) to have a mass-average particle diameter of 0.4 µm or less makes it possible to inhibit the flowability of the transparent thermoplastic resin composition and the transparency and color tone of the molded article from decreasing. The mass-average particle diameter is determined as follows: a latex of the rubbery polymer (r) is diluted and dispersed in an aqueous medium. Then, the particle diameter distribution is measured using a particle size distribution measurement device based on a laser scattering diffraction method; and the mass-average particle diameter is calculated from the particle diameter distribution.

Examples of the aromatic vinyl-based monomer (a1) to be used as a component of the vinyl-based monomer mixture (a) include styrene, α-methylstyrene, p-methylstyrene, m-methylstyrene, o-methylstyrene, vinyltoluene, t-butylstyrene and the like. It is possible to contain two or more of these as the aromatic vinyl-based monomer (a1). Among the aromatic vinyl-based monomers (a1), styrene is preferable from the viewpoint of further enhancing the flowability of the transparent thermoplastic resin composition and the transparency and stiffness of the molded article.

The amount of the aromatic vinyl-based monomer (a1) in the vinyl-based monomer mixture (a) is preferably 5 mass % or more, more preferably 10 mass % or more, still more preferably 20 mass % or more, with respect to 100 mass % of the total of the vinyl-based monomer mixture (a) from the viewpoint of further enhancing the flowability of the transparent thermoplastic resin composition and the stiffness of the molded article. On the other hand, the amount of the aromatic vinyl-based monomer (a1) in the vinyl-based monomer mixture (a) is preferably 40 mass % or less, more preferably 35 mass % or less, still more preferably 30 mass % or less, from the viewpoint of enhancing the impact resistance and transparency of the molded article.

Preferable examples of the (meth)acrylic acid ester-based monomer (a2) to be used as a component of the vinyl-based monomer mixture (a) include esters composed of a $C_{1-6}$ alcohol and an acrylic acid or a methacrylic acid. Such an ester of a $C_{1-6}$ alcohol and an acrylic acid or a methacrylic acid may further have a substituent such as a hydroxyl group or a halogen group. Examples of esters of a $C_{1-6}$ alcohol and an acrylic acid or a methacrylic acid include methyl (meth) acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 3-hydroxypropyl (meth)acrylate, 2,3,4,5,6-pentahydroxyhexyl (meth)acrylate, 2,3,4,5-tetrahydroxypentyl (meth)acrylate and the like. It is possible to contain two or more of these as the (meth)acrylic acid ester-based monomer (a2). Among the (meth)acrylic acid ester-based monomers (a2), methyl (meth)acrylate is preferable from the viewpoint of enhancing the transparency of the molded article. In this regard, "(meth)" means that the word "meth" may be affixed or otherwise. For example, a "(meth)acrylic acid" refers to an acrylic acid or a methacrylic acid.

The amount of the (meth)acrylic acid ester-based monomer (a2) contained in the vinyl-based monomer mixture (a) is preferably 30 mass % or more, more preferably 50 mass % or more, still more preferably 70 mass % or more, with respect to 100 mass % of the total of the vinyl-based monomer mixture (a), from the viewpoint of enhancing the transparency of the molded article. On the other hand, the amount of the (meth)acrylic acid ester-based monomer (a2) contained in the vinyl-based monomer mixture (a) is preferably 90 mass % or less, more preferably 85 mass % or less, still more preferably 80 mass % or less, from the viewpoint of further enhancing the transparency of the molded article.

In addition, the above-mentioned another monomer that can be copolymerized with the aromatic vinyl-based monomer (a1) and the (meth)acrylic acid ester-based monomer (a2) is not limited to any particular monomer, provided that such another monomer is a vinyl-based monomer other than the (a1) and the (a2), and does not impair the desired effect. Specific examples of such another monomer include the vinyl cyanide-based monomer (a3), unsaturated aliphatic acids, acrylamide-based monomers, maleimide-based monomers and the like. It is possible to contain two or more of these.

Examples of the vinyl cyanide-based monomer (a3) in the vinyl-based monomer mixture (a) include acrylonitrile, methacrylonitrile, ethacrylonitrile and the like. It is possible to contain two or more of these as the vinyl cyanide-based monomer (a3). Among the vinyl cyanide-based monomers (a3), acrylonitrile is preferable from the viewpoint of further enhancing the impact resistance of the molded article.

The amount of the vinyl cyanide-based monomer (a3) contained in the vinyl-based monomer mixture (a) is preferably 2 mass % or more, more preferably 3 mass % or more, still more preferably 4 mass % or more, with respect to 100 mass % of the total of the vinyl-based monomer mixture (a), from the viewpoint of enhancing the impact resistance of the molded article. On the other hand, the amount of the vinyl cyanide-based monomer (a3) contained in the vinyl-based monomer mixture (a) is preferably 20 mass % or less, more preferably 15 mass % or less, still more preferably 5 mass % or less, from the viewpoint of enhancing the flowability of the transparent thermoplastic resin composition and the color tone of the molded article.

Examples of an unsaturated aliphatic acid that can be used as a component of the monomer mixture (a) include itaconic acid, maleic acid, fumaric acid, butenoic acid, acrylic acids, methacrylic acids and the like. Examples of acrylamide-based monomers include acrylamides, methacrylamides, N-methyl acrylamide and the like. Examples of maleimide-based monomers include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, N-phenylmaleimide and the like.

The graft copolymer (A) can be partially soluble in acetone, and the weight-average molecular weight of the acetone-soluble component is preferably, but not limited particularly to, 50,000 or more, more preferably 60,000 or more. The value of 50,000 or more as the weight-average molecular weight of the acetone-soluble component in the graft copolymer (A) makes it possible to further enhance the impact resistance of the molded article. On the other hand, the weight-average molecular weight of the acetone-soluble component in the graft copolymer (A) is preferably 120,000 or less, more preferably 100,000 or less. The value of 120,000 or less as the weight-average molecular weight of the acetone-soluble component in the graft copolymer (A) makes it possible to further enhance the flowability of the transparent thermoplastic resin composition.

The weight-average molecular weight of the acetone-soluble component in the graft copolymer (A) can be determined as follows: the graft copolymer (A) is introduced into acetone so that the soluble component is dissolved in the acetone; a filtrate obtained by filtering off the acetone-insoluble components in the graft copolymer (A) is concentrated using a rotary evaporator to yield an acetone-soluble component sample; approximately 0.03 g of the sample is dissolved in approximately 15 g of tetrahydrofuran to prepare an approximately 0.2 mass % solution; and this solution is used for measurement to yield a GPC chromatogram, which is used for determination in terms of polymethyl methacrylate as a standard substance. In this regard, the GPC measurement can be performed under the following conditions.

Measurement device: Waters 2695
Column temperature: 40° C.
Detector: RI2414 (differential refractometer)
Carrier eluent flow rate: 0.3 ml/min (solvent: tetrahydrofuran)
Column: TSKgel SuperHZM-M (6.0 mm I.D.×15 cm) and TSKgel SuperHZM-N (6.0 mm I.D.×15 cm) in series (both manufactured by Tosoh Corporation)

The graft ratio of the graft copolymer (A) is not limited to any particular value, and is preferably 10% or more and 100% or less, from the viewpoint of enhancing the impact resistance of the molded article.

The graft ratio of the graft copolymer (A) can be determined by the following method. First, 80 ml of acetone is added to approximately 1 g of graft copolymer (A), and the resulting mixture is refluxed in a hot-water bath at 70° C. for three hours. Centrifuging this solution at 8000 r.p.m. (10000 G) for 40 minutes is followed by filtering the insoluble component off to yield an acetone-insoluble component. The resulting acetone-insoluble component is dried under reduced pressure at 80° C. for five hours, the mass of the resulting component is then measured (as n (g) in the following equation), and the graft ratio is calculated using the following equation. m is the mass (g) of the graft copolymer (A) sample used, and X is the amount (mass %) of the rubbery polymer contained in the graft copolymer (A).

$$\text{Graft Ratio (\%)} = \{[(n)-((m) \times X/100)]/[(m) \times X/100]\} \times 100$$

A difference in the refractive index between the graft component (acetone-insoluble component) of the graft copolymer (A) and the rubbery polymer (r) is preferably 0.03 or less, more preferably 0.01 or less. Reducing, to 0.03 or less, the difference in the refractive index between the graft component (acetone-insoluble component) of the graft copolymer (A) and the rubbery polymer (r) makes it possible to enhance the transparency and color tone of the molded article.

The refractive index of the graft component of the graft copolymer (A) depends mainly on the composition of the vinyl-based monomers as raw materials, and thus, selecting the kinds and composition ratios of the vinyl-based monomers suitably makes it possible to control the refractive index in a desired range. In particular, when the high-molecular-weight polymer conversion ratio is brought to 95% or more by emulsion polymerization, the composition of the graft component results in being substantially the same as the composition of the vinyl-based monomer mixture (a).

The refractive index of the graft component of the graft copolymer (A) can be estimated on the basis of the refractive index and amount of the vinyl-based monomer. For example, for a copolymer of styrene, methyl methacrylate, and acrylonitrile, the refractive index of the graft component of the graft copolymer (A) can be estimated in accordance with the following equation.

$$nD(G)=(1.595 \times MS/100)+(1.490 \times MM/100)+(1.510 \times MA/100)$$

nD(G) represents the refractive index of the graft component of the graft copolymer (A), MS represents the styrene content (mass %), MM represents the methyl methacrylate content (mass %), and MA represents the acrylonitrile content (mass %). 1.595 represents the refractive index of polystyrene, 1.490 represents the refractive index of poly (methyl methacrylate), and 1.510 represents the refractive index of polyacrylonitrile. In this regard, the refractive index of each of polystyrene, poly(methyl methacrylate), and polyacrylonitrile can be measured using an Abbe's refractometer.

In addition, the refractive index of the graft component of the graft copolymer (A) can be measured using an Abbe's refractometer, in which the graft component is obtained by dissolving the graft copolymer (A) in acetone, and drying the residue obtained by filtering the acetone-soluble component.

As a method of producing the graft copolymer (A), emulsion polymerization is more preferably used, because such a method makes it possible to easily adjust the particle diameter of the rubbery polymer (r) in a desired range, and to easily adjust the polymerization stability by removing heat during polymerization.

When the graft copolymer (A) is produced by emulsion polymerization, feeding the rubbery polymer (r) and the vinyl-based monomer mixture (a) is not limited to any particular method. For example, all these may be fed in a lump initially, part of the vinyl-based monomer mixture (a) may be continuously fed in order to adjust the distribution in the copolymer composition, or part or all of the vinyl-based monomer mixture (a) may be fed in installments. Feeding part of the vinyl-based monomer mixture (a) continuously means feeding part of the vinyl-based monomer mixture (a) initially, followed by feeding the rest sequentially and continuously. In addition, feeding the vinyl-based monomer mixture (a) in installments means feeding the vinyl-based monomer mixture (a) at a point(s) of time later than the initial feeding.

When the graft copolymer (A) is produced by emulsion polymerization, any kind of surfactant may be added as an emulsifier. A particularly preferable kind of surfactant is an anion-based surfactant such as of a carboxylic acid salt, sulfuric acid ester salt, or sulfonic acid salt, and two or more of anion-based surfactants may be used in combination. In this regard, examples of salts mentioned here include: alkali metal salts such as sodium salt, lithium salt, and potassium salt; ammonium salt; and the like.

Examples of carboxylic acid salt emulsifiers include caprylic acid salt, capric acid salt, lauryl acid salt, myristic acid salt, palmitic acid salt, stearic acid salt, oleic acid salt, linoleic acid salt, linolenic acid salt, rhodinic acid salt, behenic acid salt, dialkylsulfosuccinic acid salt and the like.

Examples of sulfuric acid ester salt emulsifiers include castor oil sulfuric acid ester salt, lauryl alcohol sulfuric acid ester salt, polyoxyethylene lauryl sulfuric acid salt, polyoxyethylene alkyl ether sulfuric acid salt, polyoxyethylene alkylphenyl ether sulfuric acid salt and the like.

Examples of sulfonic acid salt emulsifiers include dodecylbenzene sulfonic acid salt, alkylnaphthalene sulfonic acid salt, alkyldiphenyl ether disulfonic acid salt, naphthalene sulfonic acid salt condensate and the like.

When the graft copolymer (A) is produced by emulsion polymerization, an initiator may be added, if needed. Examples of initiators include peroxides, azo-based compounds, water-soluble potassium persulfate and the like, and these may be used in combination of two or more kinds thereof. In addition, a redox initiator may be used as the initiator.

Examples of peroxides include benzoyl peroxide, cumene hydroperoxide, dicumyl peroxide, diisopropyl benzene hydroperoxide, t-butyl hydroperoxide, t-butyl peroxyacetate, t-butyl peroxybenzoate, t-butylisopropyl carbonate, di-t-butyl peroxide, t-butyl peroxyoctate, 1,1-bis(t-butylperoxy)3,3,5-trimethylcyclohexane, 1,1-bis(t-butylperoxy)cyclohexane, t-butylperoxy-2-ethylhexanoate and the like. Among these, peroxides that are particularly preferably used are cumene hydroperoxide, 1,1-bis(t-butylperoxy)3,3,5-trimethyl cyclohexane, and 1,1-bis(t-butylperoxy)cyclohexane.

Examples of azo-based compounds include azobisisobutyronitrile, azobis(2,4-dimethylvaleronitrile), 2-phenylazo-2,4-dimethyl-4-methoxyvaleronitrile, 2-cyano-2-propylazoformamide, 1,1'-azobiscyclohexane-1-carbonitrile, azobis(4-methoxy-2,4-dimethylvaleronitrile), dimethyl 2,2'-azobisisobutyrate, 1-t-butylazo-2-cyanobutane, 2-t-butylazo-2-cyano-4-methoxy-4-methylpentane and the like. Among the azo-based compounds, 1,1'-azobiscyclohexane-1-carbonitrile is particularly preferably used.

The addition amount of an initiator to be used to produce the graft copolymer (A) is not limited to any particular value, and is preferably 0.1 part by mass or more and 0.5 part by mass or less with respect to 100 parts by mass of the total of the rubbery polymer (r) and the vinyl-based monomer mixture (a) from the viewpoint of ease of adjusting the weight-average molecular weight of the graft copolymer (A) within the above-mentioned range.

In production of the graft copolymer (A), a chain transfer agent may be used. Using a chain transfer agent makes it possible to easily adjust the weight-average molecular weight and graft ratio of the graft copolymer (A) within a desired range. Examples of chain transfer agents include: (i) mercaptans such as n-octyl mercaptan, t-dodecyl mercaptan, n-dodecyl mercaptan, n-tetradecyl mercaptan, and n-octadecyl mercaptan; (ii) terpenes such as terpinolene; and the like, and these may be used in combination of two or more kinds thereof. Among the chain transfer agents, n-octyl mercaptan and t-dodecyl mercaptan are preferably used.

The addition amount of a chain transfer agent to be used to produce the graft copolymer (A) is not limited to any particular value. From the viewpoint of ease of adjusting the weight-average molecular weight, dispersity, and graft ratio of the graft copolymer (A) within the above-mentioned ranges, the addition amount of a chain transfer agent to be used to produce the graft copolymer (A) is preferably 0.2 part by mass or more, more preferably 0.4 part by mass or more, and preferably 0.7 part by mass or less, more preferably 0.6 part by mass or less, with respect to 100 parts by mass of the total of the rubbery polymer (r) and the vinyl-based monomer mixture (a).

When the graft copolymer (A) is produced by emulsion polymerization, the polymerization temperature is not limited to any particular value, and is preferably 40° C. or more and 70° C. or less from the viewpoint of ease of adjusting the weight-average molecular weight and dispersity of the graft copolymer (A) within the above-mentioned range, and from the viewpoint of emulsification stability.

When the graft copolymer (A) is produced by emulsion polymerization, it is common that a coagulating agent is added to a graft copolymer latex to collect the graft copolymer (A). An acid or a water-soluble salt is preferably used as a coagulating agent.

Examples of acids to be used as coagulating agents include sulfuric acid, hydrochloric acid, phosphoric acid, acetic acid and the like. Examples of water-soluble salts to be used as coagulating agents include calcium chloride, magnesium chloride, barium chloride, aluminum chloride, magnesium sulfate, aluminum sulfate, aluminum ammonium sulfate, aluminum potassium sulfate, aluminum sodium sulfate and the like. These may be used in combination two or more kinds thereof. The emulsifier is preferably not allowed to remain in the transparent thermoplastic resin composition, from the viewpoint of enhancing the color tone of the molded article. Because of this, it is preferable that an alkali fatty acid salt is used as the emulsifier for acid coagulation, and then neutralized, for example, with an alkali such as sodium hydroxide so that the emulsifier can be removed.

The vinyl-based copolymer (B) constituting a transparent thermoplastic resin composition may be obtained by copolymerizing a monomer mixture (b) containing at least an aromatic vinyl-based monomer (b1), a (meth)acrylic acid ester-based monomer (b2), and a vinyl cyanide-based monomer (b3). That is, the vinyl-based copolymer (B) is a copolymer of the monomer mixture (b) containing the aromatic vinyl-based monomer (b1), the (meth)acrylic acid ester-based monomer (b2), and the vinyl cyanide-based monomer (b3). The vinyl-based monomer mixture (b) may further contain another monomer that can be copolymerized with the (b1) to the (b3).

Examples of the aromatic vinyl-based monomer (b1) include the monomers enumerated as the aromatic vinyl-based monomer (a1), and styrene is preferable.

The amount of the aromatic vinyl-based monomer (b1) in the vinyl-based monomer mixture (b) is preferably 5 mass % or more, more preferably 10 mass % or more, still more preferably 20 mass % or more, with respect to 100 mass % of the total of the vinyl-based monomer mixture (b) from the viewpoint of further enhancing the flowability of the transparent thermoplastic resin composition and the stiffness of the molded article. On the other hand, the amount of the aromatic vinyl-based monomer (b1) contained in the vinyl-based monomer mixture (b) is preferably 40 mass % or less, more preferably 30 mass % or less, still more preferably 25 mass % or less, with respect to 100 mass % of the total of the vinyl-based monomer mixture (b), from the viewpoint of enhancing the impact resistance and transparency of the molded article.

Examples of the (meth)acrylic acid ester-based monomer (b2) to be used as a component of the vinyl-based monomer mixture (b) include the monomers enumerated as the (meth) acrylic acid ester-based monomer (a2), and methyl (meth) acrylate is preferable.

The amount of the (meth)acrylic acid ester-based monomer (b2) contained in the vinyl-based monomer mixture (b) is preferably 30 mass % or more, more preferably 50 mass % or more, still more preferably 60 mass % or more, with respect to 100 mass % of the total of the vinyl-based monomer mixture (b), from the viewpoint of enhancing the transparency of the molded article. On the other hand, the amount of the (meth)acrylic acid ester-based monomer (b2) contained in the vinyl-based monomer mixture (b) is preferably 85 mass % or less, more preferably 80 mass % or less, still more preferably 75 mass % or less, with respect to 100 mass % of the total of the vinyl-based monomer mixture (b), from the viewpoint of further enhancing the transparency of the molded article.

Examples of the vinyl cyanide-based monomer (b3) to be used as a component of the vinyl-based monomer mixture (b) include acrylonitrile, methacrylonitrile, ethacrylonitrile and the like. It is possible to contain two or more of these as the vinyl cyanide-based monomer (b3). Among the vinyl cyanide-based monomers (b3), acrylonitrile is preferable from the viewpoint of further enhancing the impact resistance of the molded article.

The amount of the vinyl cyanide-based monomer (b3) contained in the vinyl-based monomer mixture (b) is preferably 2 mass % or more, more preferably 3 mass % or more, with respect to 100 mass % of the total of the vinyl-based monomer mixture (b), from the viewpoint of further enhancing the impact resistance of the molded article. On the other hand, the amount of the vinyl cyanide-based monomer (b3) contained in the vinyl-based monomer mixture (b) is preferably 20 mass % or less, more preferably 10 mass % or less, still more preferably 5 mass % or less, with respect to 100 mass % of the total of the vinyl-based monomer mixture (b), from the viewpoint of enhancing the color tone of the molded article.

In addition, the above-mentioned another monomer that can be copolymerized with the aromatic vinyl-based monomer (b1), the (meth)acrylic acid ester-based monomer (b2), and the vinyl cyanide-based monomer (b3) is not limited to any particular monomer, provided that such another monomer is a vinyl-based monomer other than the (b1) to the (b3), and does not impair the desired effect. Specific examples of such another monomer include unsaturated aliphatic acids, acrylamide-based monomers, maleimide-based monomers and the like. It is possible to contain two or more of these. Examples of unsaturated aliphatic acids include itaconic acid, maleic acid, fumaric acid, butenoic acid, acrylic acids, methacrylic acids and the like. Examples of acrylamide-based monomers include acrylamides, methacrylamides, N-methyl acrylamide and the like. Examples of maleimide-based monomers include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, N-phenylmaleimide and the like.

The weight-average molecular weight of the vinyl-based copolymer (B) is preferably 70,000 or more, more preferably 80,000 or more. Bringing the weight-average molecular weight of the vinyl-based copolymer (B) to 70,000 or more makes it possible to further enhance the impact resistance of the molded article. On the other hand, the weight-average molecular weight of the vinyl-based copolymer (B) is preferably 200,000 or less, more preferably 150,000 or less, still more preferably 100,000 or less. Bringing the weight-average molecular weight of the vinyl-based copolymer (B) to 200,000 or less makes it possible to further enhance the flowability of the transparent thermoplastic resin composition. The vinyl-based copolymer (B) having a weight-average molecular weight in the range of 70,000 or more and 200,000 or less can be easily produced, for example, through using the below-mentioned initiator and chain transfer agent and controlling the polymerization temperature in the below-mentioned preferable range.

The weight-average molecular weight of the vinyl-based copolymer (B) can be determined as follows: an approximately 0.2 mass % solution of approximately 0.03 g of the vinyl-based copolymer (B) dissolved in approximately 15 g of tetrahydrofuran is used for measurement to yield a GPC chromatogram, which is used for determination in terms of polymethyl methacrylate as a standard substance. In this regard, the GPC measurement can be performed under the following conditions.

Measurement device: Waters 2695
Column temperature: 40° C.
Detector: RI2414 (differential refractometer)
Carrier eluent flow rate: 0.3 ml/min (solvent: tetrahydrofuran)
Column: TSKgel SuperHZM-M (6.0 mm I.D.×15 cm) and TSKgel SuperHZM-N (6.0 mm I.D.×15 cm) in series (both manufactured by Tosoh Corporation)

The vinyl-based copolymer (B) is such that a difference between the refractive index of the vinyl-based copolymer (B) and the refractive index of the rubbery polymer (r) contained in the graft copolymer (A) is preferably 0.03 or less, more preferably 0.01 or less. Reducing, to 0.03 or less, the difference between the refractive index of the vinyl-based copolymer (B) and the refractive index of the rubbery polymer (r) makes it possible to enhance the transparency and color tone of the molded article.

The refractive index of the vinyl-based copolymer (B) depends mainly on the composition of a vinyl-based monomer as a raw material, and thus, selecting the kind and composition ratio of the vinyl-based monomer suitably makes it possible to controlling the refractive index in a desired range. In this regard, the refractive index of the vinyl-based copolymer (B) can be estimated from the refractive index and amount of the vinyl-based monomer. For example, when the copolymer is composed of styrene, methyl methacrylate, and acrylonitrile, the refractive index of the vinyl-based copolymer (B) can be estimated in accordance with the following equation.

$$nD(B)=(1.595\times MS/100)+(1.490\times MM/100)+(1.510\times MA/100)$$

nD(B) represents the refractive index of the vinyl-based copolymer (B), MS represents the styrene content (mass %), MM represents the methyl methacrylate content (mass %), and MA represents the acrylonitrile content (mass %). 1.595 represents the refractive index of polystyrene, 1.490 represents the refractive index of poly(methyl methacrylate), and 1.510 represents the refractive index of polyacrylonitrile. In this regard, the refractive index of each of polystyrene, poly(methyl methacrylate), and polyacrylonitrile can be measured using an Abbe's refractometer.

In addition, the refractive index of the vinyl-based copolymer (B) can be measured using an Abbe's refractometer.

A method of producing the vinyl-based copolymer (B) is not limited to any particular method, and continuous bulk polymerization or continuous solution polymerization is preferably used from the viewpoint of the flowability of the resulting transparent thermoplastic resin composition and the transparency and color tone of the molded article. Continuous bulk polymerization is a method in which a monomer mixture is introduced sequentially and continuously, and the bulk-polymerized vinyl-based copolymer is discharged sequentially and continuously. Continuous solution polymerization is a method in which a monomer mixture and a solvent are introduced sequentially and continuously, and a solution composed of the solution-polymerized vinyl-based copolymer and the solvent is discharged sequentially and continuously.

For a method of producing the vinyl-based copolymer (B) by continuous bulk polymerization or continuous solution polymerization, arbitrary conditions and techniques can be adopted, and examples include a method in which polymerizing the vinyl-based monomer mixture (b) in a polymerization vessel is followed by demonomerization (desolvation and devolatilization).

Examples of polymerization vessels that can be used include: mixing type polymerization vessels having an agitating blade such as a paddle blade, turbine blade, propeller blade, brumargin blade, multistage blade, anchor blade, Maxblend blade, or double helical impeller; various column type reactors; and the like. In addition, a multitube reactor, kneader type reactor, a twin screw extruder or the like can be used as a polymerization reactor (for example, see "Assessment of Impact-resistant Polystyrene," Assessment of Polymer Production Process, 10, The Society of Polymer Science, Japan (Jan. 26, 1989)).

When the vinyl-based copolymer (B) is produced, two or more of the above-mentioned polymerization vessels or polymerization reactors (vessels) may be used, and, if needed, two or more of the polymerization vessels or polymerization reactors may be combined. From the viewpoint of decreasing the dispersity of the vinyl-based copolymer (B), the number of the polymerization vessels or polymerization reactors (vessels) is preferably two or less, and a single-vessel complete mixing reactor is more preferable.

The reaction mixture obtained by polymerization in the above-mentioned polymerization vessel or polymerization reactor is usually supplied in a demonomerization step subsequently, and from the reaction mixture, monomers, solvents, and other volatile components are removed. Examples of methods of demonomerization include: a method in which a single screw or twin screw extruder having a vent is used to remove a volatile component through the vent hole under heating and under normal pressure or reduced pressure; a method in which an evaporator having a plate-fin heater such as of a centrifugal type built in a drum is used to remove a volatile component; a method in which a thin-film evaporator such as of a centrifugal type is used to remove a volatile component; a method in which a multipipe heat exchanger is used for preheating and foaming, and the material is flushed into a vacuum chamber to remove a volatile component; and the like. Among the methods of demonomerization, a method to be preferably used is particularly a method in which a single screw or twin screw extruder having a vent is used to remove a volatile component.

In production of the vinyl-based copolymer (B), an initiator or a chain transfer agent may be used suitably. Examples of such initiators and chain transfer agents include the same initiators and the same chain transfer agents as enumerated for the method of producing the graft copolymer (A).

The addition amount of an initiator to be used to produce the vinyl-based copolymer (B) is not limited to any particular value, and is preferably 0.01 part by mass or more and 0.03 part by mass or less with respect to 100 parts by mass of the total of the vinyl-based monomer mixture (b) from the viewpoint of ease of adjusting the weight-average molecular weight of the vinyl-based copolymer (B) within the above-mentioned range.

The addition amount of a chain transfer agent to be used to produce the vinyl-based copolymer (B) is not limited to any particular value, and is preferably 0.05 part by mass or more and 0.40 part by mass or less with respect to 100 parts by mass of the total of the vinyl-based monomer mixture (b) from the viewpoint of ease of adjusting the weight-average molecular weight of the vinyl-based copolymer (B) within the above-mentioned range.

When the vinyl-based copolymer (B) is produced by continuous bulk polymerization or continuous solution polymerization, the polymerization temperature is not limited to any particular value, and is preferably 120° C. or more and 140° C. or less from the viewpoint of ease of adjusting the weight-average molecular weight of the vinyl-based copolymer (B) within the above-mentioned range.

When the vinyl-based copolymer (B) is produced by continuous solution polymerization, the amount of a solvent in the polymer solution is preferably 30 mass % or less, more preferably 20 mass % or less, from the viewpoint of productivity. A solvent to be used is preferably ethyl benzene or methyl ethyl ketone, particularly preferably ethyl benzene, from the viewpoint of polymerization stability.

A transparent thermoplastic resin composition is preferably formed by blending the following: 10 parts by mass or more and 60 parts by mass or less of the graft copolymer (A), and 40 parts by mass or more and 90 parts by mass or less of the vinyl-based copolymer (B), with respect to 100 parts by mass of the total of the graft copolymer (A) and the vinyl-based copolymer (B). Having 10 parts by mass or more of the graft copolymer (A) and 90 parts by mass or less of the vinyl-based copolymer (B) makes it possible to inhibit the impact resistance of the molded article from decreasing. It is more preferable that the amount of the graft copolymer (A) is 20 parts by mass or more, and the amount of the vinyl-based copolymer (B) is 80 parts by mass or less, with respect to 100 parts by mass of the total of the graft copolymer (A) and the vinyl-based copolymer (B). In addition, having 60 parts by mass or less of the graft copolymer (A) and 40 parts by mass or more of the vinyl-based copolymer (B) makes it possible to inhibit the melt viscosity of the transparent thermoplastic resin composition from increasing, inhibit the flowability from decreasing, and also inhibit the transparency and the color tone from decreasing. It is more preferable to blend 50 parts by mass or less of the graft copolymer (A) and 50 parts by mass or more of the vinyl-based copolymer (B) with respect to 100 parts by mass of the total of the graft copolymer (A) and the vinyl-based copolymer (B).

A transparent thermoplastic resin composition may further contain a polydimethyl siloxane gum (C).

The polydimethyl siloxane gum (C) is represented by Formula (1), and $R_1$, $R_2$, $R_3$, and $R_4$ in Formula (1) are each a $CH_3$ (methyl) group. A modified silicone compound having a structure in which any of $R_1$, $R_2$, $R_3$, and $R_4$ in Formula (1) is modified with a polar group such as a phenyl group, amino group, hydroxyl group, or epoxy group is compatible with the transparent thermoplastic resin composition, and thus, the molded article has poorer impact resistance.

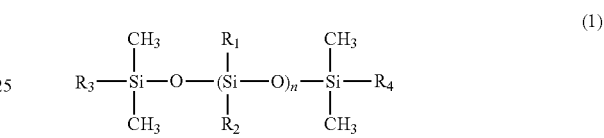

(1)

wherein $R_1$, $R_2$, $R_3$ and $R_4$ are methyl groups; and n is a positive integer that gives a weight average molecular weight of 300,000 or more.

The polydimethyl siloxane gum (C) refers to a gummy polydimethyl siloxane having a weight-average molecular weight of 300,000 or more. In this regard, the polydimethyl siloxane having a weight-average molecular weight of 300,000 or more is not liquid but gummy. The upper limit of the weight-average molecular weight of the polydimethyl siloxane gum (C) is usually, but not limited particularly to, 600,000.

The weight-average molecular weight of the polydimethyl siloxane gum (C) can be determined as follows: an approximately 1.0 mass % solution of approximately 0.15 g of the polydimethyl siloxane gum (C) dissolved in approximately 15 g of tetrahydrofuran is used for measurement to yield a GPC (gel permeation chromatography) chromatogram, which is used for determination in terms of polystyrene as a standard substance. In this regard, the GPC measurement can be performed under the following conditions.

Measurement device: Waters 2695
Column temperature: 40° C.
Detector: RI2414 (differential refractometer)
Carrier eluent flow rate: 0.3 ml/min (solvent: tetrahydrofuran)
Column: TSKgel SuperHZM-M (6.0 mm I.D.×15 cm) and TSKgel SuperHZM-N (6.0 mm I.D.×15 cm) in series (both manufactured by Tosoh Corporation)

The weight-average molecular weight of the polydimethyl siloxane gum (C) is 300,000 or more. Having a weight-average molecular weight of 300,000 or more makes it possible to enhance the impact resistance of the molded article, and in addition, makes it possible to enhance the flowability of the transparent thermoplastic resin composition, and to improve the mold deposition, that is, the property of preventing contamination of a mold.

A transparent thermoplastic resin composition may contain 15 ppm or more and 40 ppm or less of the polydimethyl siloxane gum (C) with respect to 100 parts by mass of the total of the graft copolymer (A) and the vinyl-based copolymer (B). In this regard, ppm is parts per million on a [mass]/[mass] basis. The amount of the polydimethyl siloxane gum (C) is preferably 20 ppm or more and 35 ppm or less. Containing less than 15 ppm of the polydimethyl siloxane gum (C) with respect to 100 parts by mass of the total of the graft copolymer (A) and the vinyl-based copolymer (B) causes the molded article to have lower impact resistance. On the other hand, containing more than 40 ppm of the polydimethyl siloxane gum (C) with respect to 100 parts by mass of the total of the graft copolymer (A) and the vinyl-based copolymer (B) causes the molded article to have lower transparency and mold deposition.

The polydimethyl siloxane gum (C) used here is considered to exist at the interface between the rubbery polymer (r) and the vinyl-based copolymer (B). Having the polydimethyl siloxane gum (C) existing at the interface between the rubbery polymer (r) and the vinyl-based copolymer (B) makes it possible that the interface exhibits enhanced slipperiness when the transparent thermoplastic resin composition undergoes impact, and that the impact is concentrated on the rubbery polymer (r) particles. In addition, the polydimethyl siloxane gum (C) is considered to be contributive to decreasing the residual stress generated during molding. These things are considered to be contributive to enhancing the impact resistance of the molded article. Furthermore, binging the weight-average molecular weight of the polydimethyl siloxane gum (C) to 300,000 or more makes it possible to inhibit the surface bleed of the polydimethyl siloxane gum (C) and the absorption into the rubber during production of the transparent thermoplastic resin composition. This consequently makes it possible to enhance the flowability and mold deposition of the transparent thermoplastic resin composition.

To the extent that the effects are not impaired, a transparent thermoplastic resin composition can contain a polymer other than the above-mentioned graft copolymer (A) and vinyl-based copolymer (B), and contain another material, examples of which include the following: inorganic fillers such as glass fibers, glass powders, glass beads, glass flakes, alumina, alumina fibers, carbon fibers, graphite fibers, stainless steel fibers, whisker, potassium titanate fibers, wollastonite, asbestos, hard clay, calcined clay, talc, kaolin, mica, calcium carbonate, magnesium carbonate, aluminum oxide, and minerals; antioxidants such as are hindered phenol-based, sulfur-containing compound-based, or phosphorus-containing organic compound-based; heat stabilizers such as are phenol-based or acrylate-based; ultraviolet absorbers such as are benzotriazole-based, benzophenone-based, or salicylate-based; hindered amine-based light stabilizers; lubricants and plasticizers such as higher fatty acids, acid esters, acid amide-based agents, and higher alcohols; release agents such as montanoic acid and salts thereof, esters thereof, half esters thereof, stearyl alcohols, stearamide, and ethylene wax; various flame retardants; flame retardant auxiliaries; color protection agents such as phosphite and hypophosphite; counteragents such as phosphoric acids, monosodium phosphate, maleic anhydride, and succinic anhydride; nucleating agents; antistatic agents such as are amine-based, sulfonic acid-based, or poly ether-based; colorants such as carbon black, pigments, and dyes; blueing agents; and the like.

Next, a method of producing a transparent thermoplastic resin composition will be described. A transparent thermoplastic resin composition can be obtained, for example, by melt-kneading the above-mentioned graft copolymer (A), vinyl-based copolymer (B), and, if needed, another component. A more preferable method of producing a transparent thermoplastic resin composition may be a method in which bulk-polymerizing the vinyl-based copolymer (B) continuously is followed by additionally melt-kneading the graft copolymer (A) and, if needed, another component continuously.

FIG. 1 illustrates a schematic diagram of one example of a preferably used production apparatus for a transparent thermoplastic resin composition. As depicted in FIG. 1, this production apparatus for a transparent thermoplastic resin composition includes a reactor 1 for producing a vinyl-based copolymer (B), a preheater 2 for heating the resulting vinyl-based copolymer (B) to a predetermined temperature, and a twin screw extruder-type devolatilizer 3, which are linked in this order. In the production apparatus for a transparent thermoplastic resin composition, a twin screw extruder-type feeder 5 for supplying the graft copolymer (A) is further connected to the side of the twin screw extruder-type devolatilizer 3 so that the graft copolymer can be fed through the side. The reactor 1 has an agitator (helical ribbon impeller) 7, and the twin screw extruder-type devolatilizer 3 has a vent port 8 for removing a volatile component such as an unreacted monomer.

The reaction product continuously supplied from the reactor 1 is heated to a predetermined temperature by the preheater 2, and then, supplied into the twin screw extruder-type devolatilizer 3. A volatile component such as an unreacted monomer is removed through the vent port 8 out of the system commonly at a temperature of approximately 150 to 280° C. under normal pressure or reduced pressure in the twin screw extruder-type devolatilizer 3. This removal of a volatile component is commonly performed until the volatile component reaches a predetermined amount, for example, 10 mass % or less, more preferably 5 mass % or less. In addition, the volatile component removed is preferably supplied into the reactor 1 again.

The graft copolymer (A) is supplied from the twin screw extruder-type feeder 5 through the opening provided at a position around the downstream region of the twin screw extruder-type devolatilizer 3. The twin screw extruder-type feeder 5 preferably has a heating device, and the graft copolymer (A) supplied into the twin screw extruder-type devolatilizer 3 is made semi-molten or molten so that the materials can be in a good mixing condition. The heating temperature for the graft copolymer (A) is commonly 100 to 220° C. Examples of the twin screw extruder-type feeder 5 include a twin screw extruder-type feeder composed of a screw, a cylinder, and a screw driving section, wherein the cylinder has a heating/cooling function.

At the position at which the twin screw extruder-type devolatilizer 3 is connected to the twin screw extruder-type feeder 5, the amount of the unreacted monomer is preferably already decreased to 10 mass % or less, more preferably 5 mass % or less, in order to inhibit a rubber component from being thermally degraded by a subsequent operation for removing the unreacted monomer.

The vinyl-based copolymer (B) and the graft copolymer (A) are melt-kneaded in a melt kneading zone 4 that is a region downstream of the position at which the twin screw extruder-type devolatilizer 3 is connected to the twin screw extruder-type feeder 5. Then, a transparent thermoplastic resin composition is discharged out of the system through a discharge hole 6. It is preferable that a water inlet 9 is provided on the melt kneading zone 4 and that a predetermined amount of water is added. The water injected and a volatile component such as an unreacted monomer are removed out of the system through a final vent port 10 provided further downstream.

A transparent thermoplastic resin composition may be characterized by containing a specific polydimethyl siloxane gum (C), and the polydimethyl siloxane gum (C) is not limited to any addition method. For example, when bulk-polymerizing the vinyl-based copolymer (B) continuously is followed by additionally kneading the graft copolymer (A) continuously, as above-mentioned, the polydimethyl siloxane gum (C) may be added simultaneously with the graft copolymer (A). In this example, the polydimethyl siloxane gum (C) is gummy, and thus, for example, may be preliminarily dissolved in a (meth)acrylic acid ester monomer to yield a (meth)acrylic acid ester monomer solution of the polydimethyl siloxane gum (C), and be added in the form of the solution.

Alternatively, the polydimethyl siloxane gum (C) can be added during polymerization of the graft copolymer. For example, when the monomer mixture (a) containing at least the aromatic vinyl-based monomer (a1) and the (meth) acrylic acid ester-based monomer (a2) is graft-copolymerized in the presence of the rubbery polymer (r), the polydimethyl siloxane gum (C) may be preliminarily dissolved in the monomer mixture (a) to produce a polydimethyl siloxane gum (C)-containing graft copolymer (A'). In this example, continuously bulk-polymerizing the vinyl-based copolymer (B) followed by continuously kneading the polydimethyl siloxane gum (C)-containing graft copolymer (A') added in place of the graft copolymer (A) enables the transparent thermoplastic resin composition to contain the polydimethyl siloxane gum (C).

A transparent thermoplastic resin composition can be molded by an arbitrary molding method. Examples of molding methods include injection molding, extrusion molding, inflation molding, blow molding, vacuum molding, compression molding, gas-assisted molding and the like, and injection molding is preferably used. The cylinder temperature during injection molding is preferably 210° C. or more and 320° C. or less, and the mold temperature is preferably 30° C. or more and 80° C. or less.

A transparent thermoplastic resin composition can be widely used in the form of a molded article having an arbitrary shape. Examples of molded articles include films, seats, fibers, cloths, nonwoven fabrics, injection-molded articles, extrusion-molded articles, vacuum air-pressure-molded articles, blow-molded articles, composites with other materials and the like.

A transparent thermoplastic resin composition makes it possible to obtain a transparent thermoplastic resin composition having excellent impact resistance and flowability, also having both a high transparency and good color tone, and further has good mold deposition, and thus, is useful in applications such as home electric appliances, communication devices, general merchandise, and medical devices.

EXAMPLES

Below, our compositions, molded articles and methods will be described in further detail with reference to Examples, and this disclosure is not construed to be limited to these Examples. First, evaluation methods will be described.

(1) Mass-Average Particle Diameter of Rubbery Polymer

Latex of the rubbery polymer (r) was diluted and dispersed in an aqueous medium, and then, the particle diameter distribution was measured using a particle size distribution measurement device "LS 13 320" (from Beckman Coulter, Inc.) based on a laser scattering diffraction method. From the particle diameter distribution, the mass-average particle diameter of the rubbery polymer (r) was calculated.

(2) Refractive Index of Rubbery Polymer (r)

To 150 ml of methanol being stirred at 300 rpm, 10 ml of rubber latex in an emulsified state was added, and then 20 ml of sulfuric acid adjusted to 10 mass % was added to yield a precipitate of a rubbery polymer (r). The precipitate of the rubbery polymer (r) was dried under reduced pressure at 60° C. for five hours, and then pressed under heat using a hot press set at 230° C., to produce a film having a thickness of 30±5 µm. Onto the resulting film used as a measurement sample, a small amount of 1-bromonaphthalene was dropped, and the refractive index was measured using a sodium lamp D-line as a light source, and using an Abbe's refractometer under conditions where the measurement temperature was 23° C.

(3) Weight-Average Molecular Weight of Acetone-Soluble Component of Graft Copolymer (A), and Weight-Average Molecular Weight of Vinyl-Based Copolymer (B)

The weight-average molecular weight can be determined as follows: approximately 0.03 g of sample of the acetone-soluble component of the graft copolymer (A) or sample of the vinyl-based copolymer (B) was dissolved in approximately 15 g of tetrahydrofuran to prepare an approximately 0.2 mass % solution, and this solution is used for measurement to yield a GPC chromatogram, which is used for determination in terms of polymethyl methacrylate as a standard substance. In this regard, the GPC measurement can be performed under the following conditions.

Device: Waters 2695
Column temperature: 40° C.
Detector: RI2414 (differential refractometer)
Carrier eluent flow rate: 0.3 ml/min (solvent: tetrahydrofuran)
Column: TSKgel SuperHZM-M (6.0 mm I.D.×15 cm) and TSKgel SuperHZM-N (6.0 mm I.D.×15 cm) in series (both manufactured by Tosoh Corporation)

(4) Graft Ratio of Graft Copolymer (A)

To approximately 1 g of graft copolymer (A), 80 ml of acetone was added, and the resulting mixture was refluxed in a hot-water bath at 70° C. for three hours. Centrifuging this solution at 8000 r.p.m. (10000 G) for 40 minutes is followed by filtering the insoluble component to yield an acetone-insoluble component. The resulting acetone-insoluble component is dried under reduced pressure at 80° C. for five hours, the mass of the resulting component is then measured (as n in the following equation), and the graft ratio is calculated using the following equation. m is the mass of the sample of the graft copolymer (A) used, and X is the amount (mass %) of the rubbery polymer contained in the graft copolymer (A).

$$\text{Graft Ratio (\%)} = \{[(n)-((m) \times X/100)]/[(m) \times X/100]\} \times 100$$

(5) Refractive Index of Graft Component (Acetone-Insoluble Component) of Graft Copolymer (A), and Refractive Index of Vinyl-Based Copolymer (B)

The acetone-insoluble component of the graft copolymer (A), yielded by the procedures according to (4), was made into a film having a thickness of 30±5 µm using a hot press set at 230° C. The vinyl-based copolymer (B) was made into a film having a thickness of 30±5 µm in the same manner. Onto the resulting film, a small amount of 1-bromonaphthalene was dropped, and the refractive index was measured using an Abbe's refractometer under the below-mentioned conditions.

Light source: sodium lamp D-line
Measurement temperature: 23° C.

(6) Weight-Average Molecular Weight of Polydimethyl Siloxane Gum (C), and Weight-Average Molecular Weight of Liquid Silicone Compound (D)

The weight-average molecular weight of the polydimethyl siloxane gum (C) can be determined as follows: an approximately 1.0 mass % solution of approximately 0.15 g of the polydimethyl siloxane gum (C) or the liquid silicone compound (D) dissolved in approximately 15 g of tetrahydrofuran is used for measurement to yield a GPC chromatogram, which is used for determination in terms of polystyrene as a standard substance. In this regard, the GPC measurement can be performed under the following conditions.

Measurement device: Waters 2695
Column temperature: 40° C.
Detector: RI2414 (differential refractometer)
Carrier eluent flow rate: 0.3 ml/min (solvent: tetrahydrofuran)
Column: TSKgel SuperHZM-M (6.0 mm I.D.×15 cm) and TSKgel SuperHZM-N (6.0 mm I.D.×15 cm) in series (both manufactured by Tosoh Corporation)

(7) Transparency (Haze and Total Light Transmittance)

Transparent thermoplastic resin composition pellets yielded in each of Examples and Comparative Examples were dried in a hot-air dryer at 80° C. for three hours, and then supplied into a molding machine SE-50DU manufactured by Sumitomo Heavy Industries, Ltd. with the cylinder temperature set at 230° C. The pellets were molded into a rectangular plate molded article (50 mm long, 40 mm wide, and 3 mm thick) at a mold temperature of 60° C. and a molding cycle of 20 seconds. The haze and total light transmittance of the resulting rectangular plate molded article were measured using a direct-reading haze meter manufactured by Toyo Seiki Seisaku-sho, Ltd.

(8) Color Tone (YI Value)

Transparent thermoplastic resin composition pellets yielded in each of Examples and Comparative Examples were dried in a hot-air dryer at 80° C. for three hours, and then supplied into a molding machine SE-50DU manufactured by Sumitomo Heavy Industries, Ltd. with the cylinder temperature set at 230° C. The pellets were molded into a rectangular plate molded article (50 mm long, 40 mm wide, and 3 mm thick) at a mold temperature of 60° C. and a molding cycle of 20 seconds. Five rectangular plate molded articles thus obtained were measured for a YI value in accordance with JIS K7103 (established in 1971), and a number-average value of the measurements was calculated.

(9) Impact Resistance (Charpy Impact Strength)

Transparent thermoplastic resin composition pellets yielded in each of Examples and Comparative Examples were dried in a hot-air dryer at 80° C. for three hours, and then supplied into a molding machine SE-50DU manufactured by Sumitomo Heavy Industries, Ltd. with the cylinder temperature set at 230° C. The pellets were molded into a dumbbell test piece 4 mm in thickness at a mold temperature of 60° C. and a molding cycle of 30 seconds. Five dumbbell test pieces thus obtained were measured for Charpy impact strength by a method in accordance with ISO179, and a number-average value of the measurements was calculated.

(10) Melt Flow Rate

Transparent thermoplastic resin composition pellets were dried in a hot-air dryer at 80° C. for three hours, and then measured under conditions at 220° C. and 98N in accordance with ISO-1133. A higher value as this measurement result represents a higher flowability.

(11) Mold Deposition

Transparent thermoplastic resin composition pellets yielded in each of Examples and Comparative Examples were dried in a hot-air dryer at 80° C. for three hours, and then supplied into a molding machine PS-60E manufactured by Nissei Plastic Industrial Co., Ltd. with the cylinder temperature set at 280° C. The pellets were 1,000-shot injection-molded into a rectangular plate molded article (100 mm long, 120 mm wide, and 3 mm thick) at a mold temperature of 60° C. and a molding cycle of 30 seconds. Then, the mold deposition was evaluated on the basis of the below-mentioned rating.

No change was observed on the surface of the mold: ○
Cloudiness was observed on the surface of the mold: Δ
The surface of the mold was contaminated, and the appearance of the molded article was poor: ×

(12) Nano-SIMS (Secondary Ion Mass Spectrometry)

Transparent thermoplastic resin composition pellets were dried in a hot-air dryer at 80° C. for three hours, and then supplied into a molding machine SE-50DU manufactured by Sumitomo Heavy Industries, Ltd. with the cylinder temperature set at 230° C. The pellets were molded into a dumbbell test piece at a mold temperature of 60° C. and a molding cycle of 30 seconds, wherein the test piece was 4 mm thick, and had a central parallel portion 10 mm wide.

Figure 2:
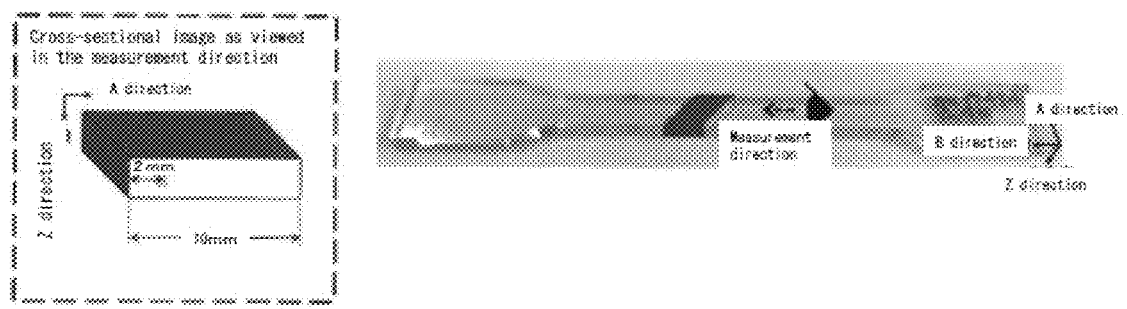
FIG. 2 is a view explaining sampling for measurement of [$^{12}C/^{12}C^{14}N$] image and a measurement position in a sample.

A cross section was cut out of the vicinity of the central portion of the resulting dumbbell test piece (see the right photograph in FIG. 2) under freezing conditions using a microtome. A measurement point was set at a point 2 mm inward from the midpoint of the shorter side of the cut cross section toward the centroid of the cross section (see the left view in FIG. 2).

The surface was observed under the below-mentioned conditions.

Device: NanoSIMS 50L (manufactured by Ametek, Inc.)
Primary ion: Cs+ (16 kV)
Secondary ion polarity: Negative
Number of data points: 256×256 pixels
Measurement region: 5 μm×5 μm
Degree of vacuum for measurement: $5 \times 10^{-10}$ mbar
Measurement element: element (isotope) [C], secondary ion [$^{12}$C$^-$]
element (isotope) [N], secondary ion [$^{12}$C$^{14}$N$^-$]

Graft Copolymer (A):

Production Example 1 Graft Copolymer (A-1)

Into a four-necked flask having an internal capacity of 5 liters and having an agitating blade, 50 parts by mass (in terms of a solid content) of polybutadiene latex (the rubber of which had a mass-average particle diameter of 0.30 μm, and the refractive index of which was 1.516), 130 parts by mass of pure water, 0.4 part by mass of sodium laurate, 0.2 part by mass of dextrose, 0.2 part by mass of sodium pyrophosphate, and 0.01 part by mass of ferrous sulfate were fed. The flask was purged with nitrogen, and the temperature was regulated to 60° C. To the resulting mixture, a monomer mixture of 3.0 parts by mass of styrene, 12.0 parts by mass of methyl methacrylate, and 0.16 part by mass of t-dodecyl mercaptan was initially added with stirring over 45 minutes.

Then, an initiator mixture of 0.3 part by mass of cumene hydroperoxide, 1.6 parts by mass of sodium laurate as an emulsifier, and 25 parts by mass of pure water was continuously added dropwise over four hours. In parallel, a monomer mixture of 9.5 parts by mass of styrene, 25.5 parts by mass of methyl methacrylate, and 0.36 part by mass of t-dodecyl mercaptan was continuously added over three hours. After the further dropwise addition of the monomer mixture, only an initiator mixture was continuously added for one hour. Furthermore, the polymerization was retained for one hour without addition of anything, and then, the polymerization was completed. The resulting graft copolymer latex was coagulated with 1.5 mass % sulfuric acid, then neutralized with sodium hydroxide, washed, centrifuged, and dried to yield a graft copolymer (A-1) in powder form (the monomer ratios: styrene, 25 mass %; and methyl methacrylate, 75 mass %). The refractive index of the acetone-insoluble component of the resulting graft copolymer (A-1) was 1.516, which was different by 0.000 from the refractive index of the rubbery polymer. The graft ratio was 50%. In addition, the acetone-soluble component had a weight-average molecular weight of 70,000.

Production Example 2 Graft Copolymer (A-2)

Into a four-necked flask having an internal capacity of 5 liters and having an agitating blade, 50 parts by mass (in terms of a solid content) of polybutadiene latex (the rubber of which had a mass-average particle diameter of 0.30 μm, and the refractive index of which was 1.516), 130 parts by mass of pure water, 0.4 part by mass of sodium laurate, 0.2 part by mass of dextrose, 0.2 part by mass of sodium pyrophosphate, and 0.01 part by mass of ferrous sulfate were fed. The flask was purged with nitrogen, and the temperature was regulated to 60° C. To the resulting mixture, a monomer mixture of 2.5 parts by mass of styrene, 2.0 parts by mass of acrylonitrile, 10.5 parts by mass of methyl methacrylate, and 0.16 part by mass of t-dodecyl mercaptan was initially added with stirring over 45 minutes.

Then, an initiator mixture of 0.3 part by mass of cumene hydroperoxide, 1.6 parts by mass of sodium laurate as an emulsifier, and 25 parts by mass of pure water was continuously added dropwise over four hours. In parallel, a monomer mixture of 9.5 parts by mass of styrene, 25.5 parts by mass of methyl methacrylate, and 0.36 part by mass of t-dodecyl mercaptan was further added dropwise continuously over three hours. After the dropwise addition of the monomer mixture, only an initiator mixture was continuously added for one hour. Furthermore, the polymerization was retained for one hour without addition of anything, and then, the polymerization was completed. The resulting graft copolymer latex was coagulated with 1.5 mass % sulfuric acid, then neutralized with sodium hydroxide, washed, centrifuged, and dried to yield a graft copolymer (A-2) in powder form (the monomer ratios: styrene, 24 mass %; acrylonitrile, 4 mass %; and methyl methacrylate, 72 mass %). The refractive index of the acetone-insoluble component of the resulting graft copolymer (A-2) was 1.516, which was different by 0.000 from the refractive index of the rubbery polymer. The graft ratio was 47%. In addition, the acetone-soluble component had a weight-average molecular weight of 72,000.

Production Example 3 Graft Copolymer (A-3)

Into a four-necked flask having an internal capacity of 5 liters and having an agitating blade, 50 parts by mass (in terms of a solid content) of polybutadiene latex (the rubber of which had a mass-average particle diameter of 0.30 μm, and the refractive index of which was 1.516), 130 parts by mass of pure water, 0.4 part by mass of sodium laurate, 0.2 part by mass of dextrose, 0.2 part by mass of sodium pyrophosphate, and 0.01 part by mass of ferrous sulfate were fed. The flask was purged with nitrogen, and the temperature was regulated to 60° C. To the resulting mixture, a monomer mixture of 3.6 parts by mass of styrene, 0.6 part by mass of acrylonitrile, 10.8 parts by mass of methyl methacrylate, and 0.16 part by mass of t-dodecyl mercaptan was initially added with stirring over 45 minutes.

Then, an initiator mixture of 0.3 part by mass of cumene hydroperoxide, 1.6 parts by mass of sodium laurate as an emulsifier, and 25 parts by mass of pure water was continuously added dropwise over four hours. In parallel, a monomer mixture of 8.4 parts by mass of styrene, 1.4 parts by mass of acrylonitrile, 25.2 parts by mass of methyl methacrylate, and 0.36 part by mass of t-dodecyl mercaptan was further added dropwise continuously over three hours. After the further dropwise addition of the monomer mixture, only an initiator mixture was continuously added for one hour. Furthermore, the polymerization was retained for one hour without addition of anything, and then, the polymerization was completed. The resulting graft copolymer latex was coagulated with 1.5 mass % sulfuric acid, then neutralized with sodium hydroxide, washed, centrifuged, and dried to yield a graft copolymer (A-3) in powder form (the monomer ratios: styrene, 24 mass %; acrylonitrile, 4 mass %; and methyl methacrylate, 72 mass %). The refractive index of the acetone-insoluble component of the resulting graft copolymer (A-3) was 1.517, which was different by 0.001 from the refractive index of the rubbery polymer. The graft ratio was 47%. In addition, the acetone-soluble component had a weight-average molecular weight of 72,000.

Production Example 4 Polysiloxane Gum-Containing Graft Copolymer (A'-4)

A polysiloxane gum-containing graft copolymer (A'-4) (the monomer ratios: styrene, 25 mass %; methyl methacrylate, 75 mass %) in powder form was obtained in the same manner as in Production Example 1 except that 83.3 ppm of the below-mentioned GENIOPLAST GUM manufactured by Wacker Asahikasei Silicone Co., Ltd. was dissolved in the monomer mixture used to be added initially. The refractive index of the acetone-insoluble component of the resulting graft copolymer (A-1) was 1.516, which was different by 0.000 from the refractive index of the rubbery polymer. The graft ratio was 50%. In addition, the acetone-soluble component had a weight-average molecular weight of 70,000.

The production conditions and measurement results of the above-mentioned graft polymer are listed in Table 1.

TABLE 1

| Graft copolymer | Rubbery polymer content (parts by mass) | Vinyl-based monomer content (parts by mass) | Vinyl-based monomer mixture (a) | | | | Feeding formulation (continuous addition) | | | Graft ratio (%) | Acetone-insoluble component Refractive index | Acetone-soluble component Weight-average molecular weight |
|---|---|---|---|---|---|---|---|---|---|---|---|---|
| | | | Feeding formulation (initial addition) | | | | | | | | | |
| | | | (a1) (parts by mass) | (a2) (parts by mass) | (a3) (parts by mass) | Polydimethyl siloxane gum (C) (ppm) | (a1) (parts by mass) | (a2) (parts by mass) | (a3) (parts by mass) | | | |
| A-1 | 50 | 50 | 3 | 12 | 0 | 0 | 9.5 | 25.5 | 0 | 50 | 1.516 | 70,000 |
| A-2 | 50 | 50 | 2.5 | 10.5 | 2 | 0 | 9.5 | 25.5 | 0 | 47 | 1.516 | 72,000 |
| A-3 | 50 | 50 | 3.6 | 10.8 | 0.6 | 0 | 8.4 | 25.2 | 1.4 | 55 | 1.517 | 72,000 |
| A-4 | 50 | 50 | 3 | 12 | 0 | 83.3 | 9.5 | 25.5 | 0 | 50 | 1.516 | 70,000 |

Polydimethyl siloxane gum (C):
GENIOPLAST GUM (C-1) (the weight-average molecular weight, 450,000) manufactured by Wacker Asahikasei Silicone Co., Ltd.
BY16-140 (C-2) (the weight-average molecular weight, 530,000) manufactured by Dow Toray Co., Ltd.
KF96H (1,000,000 centistokes) (C-3) (the weight-average molecular weight, 302,000) manufactured by Shin-Etsu Chemical Co., Ltd.

Liquid silicone compound (D) (polydimethyl siloxane oil):
KF96H (500,000 centistokes) (D-1) (the weight-average molecular weight, 249,000) manufactured by Shin-Etsu Chemical Co., Ltd.
SH200 (30,000 centistokes) (D-2) (the weight-average molecular weight, 94,000) manufactured by Dow Toray Co., Ltd.

Liquid silicone compound (D) (modified silicone oil):
KF54 (D-3) (the weight-average molecular weight, 3,000) manufactured by Shin-Etsu Chemical Co., Ltd.

Example 1

A vinyl-based copolymer and a transparent thermoplastic resin composition were produced by the below-mentioned method using a continuous bulk polymerization device composed of the following: a 2-m$^3$ complete mixing reactor having a helical ribbon impeller and a condenser for evaporation and dry distillation of monomer vapor; a single screw extruder-type preheater; a twin screw extruder-type devolatilizer; and a twin screw extruder-type feeder connected in such a manner that side feeding was allowed into a barrel section located at a distance corresponding to a ⅓ length of the devolatilizer in the upstream direction from the downstream end (outlet) of the devolatilizer.

First, a monomer mixture (b) composed of 23.5 parts by mass of styrene, 4.5 parts by mass of acrylonitrile, 72 parts by mass of methyl methacrylate, 0.29 part by mass of n-octyl mercaptan, and 0.015 part by mass of 1,1-bis(t-butylperoxy)cyclohexane was continuously supplied into the complete mixing reactor at 150 kg/hour, and continuously bulk-polymerized with the polymerization temperature maintained at 130° C. and with the vessel internal pressure maintained at 0.08 MPa. The rate of polymerization of the polymerization reaction mixture was controlled to 65±3% at the outlet of the complete mixing reactor.

Next, the polymerization reaction mixture was preheated using the single screw extruder-type preheater, and then, supplied into the twin screw extruder-type devolatilizer, and the unreacted monomer was evaporated and collected under reduced pressure through the vent port of the twin screw extruder-type devolatilizer. The unreacted monomer collected was refluxed into the continuous complete mixing reactor. To 150 kg/hour of styrene/acrylonitrile/methyl methacrylate copolymer, the apparent rate of polymerization of which had reached 99% or more at a distance corresponding to a ⅓ of the full length of the twin screw extruder-type devolatilizer in the upstream direction from the downstream end of the devolatilizer, 0.225 kg/hour of t-butylhydroxytoluene as a phenol-based stabilizer, 0.225 kg/hour of tri(nonylphenyl)phosphite as a phosphorus-based stabilizer, 64.3 kg/hour of semi-molten product of the graft copolymer (A-1) produced in Production Example 1, and 0.2576 kg/hour of solution of the polysiloxane gum (C-1) dissolved in 80-fold methyl methacrylate (the supply amount of polysiloxane gum (C-1), 0.00322 kg/hour) were supplied using the twin screw extruder-type feeder, and melt-kneaded with the styrene/acrylonitrile/methyl methacrylate copolymer in the twin screw extruder-type devolatilizer. In the melt-kneading step, 2 kg/hour of water was supplied at a distance corresponding to a ⅙ of the full length of the twin screw extruder-type devolatilizer in the upstream direction from the downstream end of the devolatilizer. This water and other volatile components were removed by evaporation under reduced pressure through the vent port disposed further downstream of the twin screw extruder-type devolatilizer. Then, the melt-kneaded product was discharged in strand form, and cut using a cutter to yield pellets of the transparent thermoplastic resin composition.

In addition, the supply from the twin screw extruder-type feeder was stopped, and the styrene/acrylonitrile/methyl methacrylate copolymer was discharged and sampled. The characteristics of the resulting styrene/acrylonitrile/methyl methacrylate copolymer and transparent thermoplastic resin composition were evaluated by the above-mentioned methods.

Example 2

Transparent thermoplastic resin composition pellets were obtained in the same manner as in Example 1 except that the supply amount of the solution of the polysiloxane gum (C-1) dissolved in 80-fold methyl methacrylate was changed to 0.4288 kg/hour (the supply amount of the polysiloxane gum (C-1), 0.00536 kg/hour).

Example 3

Transparent thermoplastic resin composition pellets were obtained in the same manner as in Example 1 except that the supply amount of the solution of the polysiloxane gum (C-1)

dissolved in 80-fold methyl methacrylate was changed to 0.6858 kg/hour (the supply amount of the polysiloxane gum (C-1), 0.00857 kg/hour).

Example 4

Transparent thermoplastic resin composition pellets were obtained in the same manner as in Example 1 except that the graft copolymer (A-2) produced in Production Example 2 was used in place of the graft copolymer (A-1) produced in Production Example 1, and that the supply amount of the solution of the polysiloxane gum (C-1) dissolved in 80-fold methyl methacrylate was changed to 0.4288 kg/hour (the supply amount of the polysiloxane gum (C-1), 0.00536 kg/hour).

Example 5

Transparent thermoplastic resin composition pellets were obtained in the same manner as in Example 1 except that the graft copolymer (A-3) produced in Production Example 3 was used in place of the graft copolymer (A-1) produced in Production Example 1, and that the supply amount of the solution of the polysiloxane gum (C-1) dissolved in 80-fold methyl methacrylate was changed to 0.4288 kg/hour (the supply amount of the polysiloxane gum (C-1), 0.00536 kg/hour).

Example 6

Transparent thermoplastic resin composition pellets were obtained in the same manner as in Example 1 except that the graft copolymer (A'-4) produced in Production Example 4 was used in place of the graft copolymer (A-1) produced in Production Example 1, and that the solution of the polysiloxane gum (C-1) dissolved in 80-fold methyl methacrylate was not supplied.

Example 7

The monomer mixture (b) used for the continuous bulk-polymerization was changed to 23.5 parts by mass of styrene, 4.5 parts by mass of acrylonitrile, 72 parts by mass of methyl methacrylate, 0.23 part by mass of n-octyl mercaptan, and 0.015 part by mass of 1,1-bis(t-butylperoxy)cyclohexane. Furthermore, transparent thermoplastic resin composition pellets were obtained in the same manner as in Example 1 except that the supply amount of the graft copolymer (A-1) produced in Production Example 1 was changed to 50 kg/hour, and that the supply amount of the solution of the polysiloxane gum (C-1) dissolved in 80-fold methyl methacrylate was changed to 0.4000 kg/hour (the supply amount of the polysiloxane gum (C-1), 0.005 kg/hour).

Example 8

Transparent thermoplastic resin composition pellets were obtained in the same manner as in Example 1 except that the polysiloxane gum (C-2) was used in place of the polysiloxane gum (C-1), and that the supply amount of the solution of the polysiloxane gum (C-2) dissolved in 80-fold methyl methacrylate was changed to 0.4288 kg/hour (the supply amount of the polysiloxane gum (C-2), 0.00536 kg/hour).

Example 9

Transparent thermoplastic resin composition pellets were obtained in the same manner as in Example 1 except that the polysiloxane gum (C-3) was used in place of the polysiloxane gum (C-1), and that the supply amount of the solution of the polysiloxane gum (C-3) dissolved in 80-fold methyl methacrylate was changed to 0.4288 kg/hour (the supply amount of the polysiloxane gum (C-3), 0.00536 kg/hour).

Comparative Example 1

Transparent thermoplastic resin composition pellets were obtained in the same manner as in Example 1 except that the solution of the polysiloxane gum (C-1) dissolved in 80-fold methyl methacrylate was not supplied.

Comparative Example 2

The continuously bulk-polymerized monomer mixture (b) was changed to 23.5 parts by mass of styrene, 4.5 parts by mass of acrylonitrile, 72 parts by mass of methyl methacrylate, 0.23 part by mass of n-octyl mercaptan, and 0.015 part by mass of 1,1-bis(t-butylperoxy)cyclohexane. Furthermore, transparent thermoplastic resin composition pellets were obtained in the same manner as in Example 1 except that the supply amount of the graft copolymer (A-1) produced in Production Example 1 was changed to 50 kg/hour, and that the solution of the polysiloxane gum (C-1) dissolved in 80-fold methyl methacrylate was not supplied.

Comparative Example 3

Transparent thermoplastic resin composition pellets were obtained in the same manner as in Example 1 except that the supply amount of the solution of the polysiloxane gum (C-1) dissolved in 80-fold methyl methacrylate was changed to 0.1714 kg/hour (the supply amount of the polysiloxane gum (C-1), 0.00214 kg/hour).

Comparative Example 4

Transparent thermoplastic resin composition pellets were obtained in the same manner as in Example 1 except that the supply amount of the solution of the polysiloxane gum (C-1) dissolved in 80-fold methyl methacrylate was changed to 0.2229 kg/hour (the supply amount of the polysiloxane gum (C-1), 0.00279 kg/hour).

Comparative Example 5

Transparent thermoplastic resin composition pellets were obtained in the same manner as in Example 1 except that the supply amount of the solution of the polysiloxane gum (C-1) dissolved in 80-fold methyl methacrylate was changed to 0.8572 kg/hour (the supply amount of the polysiloxane gum (C-1), 0.01072 kg/hour).

Comparative Example 6

Transparent thermoplastic resin composition pellets were obtained in the same manner as in Example 1 except that the solution of the polysiloxane gum (C-1) dissolved in 80-fold methyl methacrylate was not supplied, and that the supply amount of the solution of the liquid silicone compound (D-1) dissolved in 80-fold methyl methacrylate was changed to 0.4288 kg/hour (the supply amount of the liquid silicone compound (D-1), 0.00536 kg/hour).

Comparative Example 7

Transparent thermoplastic resin composition pellets were obtained in the same manner as in Example 1 except that the solution of the polysiloxane gum (C-1) dissolved in 80-fold methyl methacrylate was not supplied, and that the supply amount of the solution of the liquid silicone compound (D-2) dissolved in 80-fold methyl methacrylate was changed to 0.4288 kg/hour (the supply amount of the liquid silicone compound (D-2), 0.00536 kg/hour).

Comparative Example 8

Transparent thermoplastic resin composition pellets were obtained in the same manner as in Example 1 except that the solution of the polysiloxane gum (C-1) dissolved in 80-fold methyl methacrylate was not supplied, and that the supply amount of the solution of the liquid silicone compound (D-3) dissolved in 80-fold methyl methacrylate was changed to 0.4288 kg/hour (the supply amount of the liquid silicone compound (D-3), 0.00536 kg/hour).

Comparative Example 9

Transparent thermoplastic resin composition pellets were obtained in the same manner as in Example 1 except that the solution of the polysiloxane gum (C-1) dissolved in 80-fold methyl methacrylate was not supplied, and that the supply amount of the liquid silicone compound (D-3) was changed to 0.2143 kg/hour.

The compositions of the transparent thermoplastic resin compositions are listed in Table 2, and the evaluation results are listed in Table 3.

TABLE 2

| | Vinyl-based copolymer (B) | | | | | | Graft copolymer (A) | | Polydimethyl-siloxane gum (C) | | Liquid silicone compound (D) | |
|---|---|---|---|---|---|---|---|---|---|---|---|---|
| | Feeding formulation for vinyl-based monomers | | | Weight-average molecular weight | Refractive index | Amount blended (parts by mass) | Type | Amount blended (parts by mass) | Type | Amount blended* (ppm) | Type | Amount blended* (ppm) |
| | (b1) (mass %) | (b2) (mass %) | (b3) (mass %) | | | | | | | | | |
| Example 1 | 23.5 | 72 | 4.5 | 98,000 | 1.516 | 70 | A-1 | 30 | C-1 | 15 | | |
| Example 2 | 23.5 | 72 | 4.5 | 98,000 | 1.516 | 70 | A-1 | 30 | C-1 | 25 | | |
| Example 3 | 23.5 | 72 | 4.5 | 98,000 | 1.516 | 70 | A-1 | 30 | C-1 | 40 | | |
| Example 4 | 23.5 | 72 | 4.5 | 98,000 | 1.516 | 70 | A-2 | 30 | C-1 | 25 | | |
| Example 5 | 23.5 | 72 | 4.5 | 98,000 | 1.516 | 70 | A-3 | 30 | C-1 | 25 | | |
| Example 6 | 23.5 | 72 | 4.5 | 98,000 | 1.516 | 70 | A-4 | 30 | C-1 | 25 | | |
| Example 7 | 23.5 | 72 | 4.5 | 110,000 | 1.516 | 75 | A-1 | 25 | C-1 | 25 | | |
| Example 8 | 23.5 | 72 | 4.5 | 98,000 | 1.516 | 70 | A-1 | 30 | C-2 | 25 | | |
| Example 9 | 23.5 | 72 | 4.5 | 98,000 | 1.516 | 70 | A-1 | 30 | C-3 | 25 | | |
| Comparative Example 1 | 23.5 | 72 | 4.5 | 98,000 | 1.516 | 70 | A-1 | 30 | | | | |
| Comparative Example 2 | 23.5 | 72 | 4.5 | 110,000 | 1.516 | 75 | A-1 | 25 | | | | |
| Comparative Example 3 | 23.5 | 72 | 4.5 | 98,000 | 1.516 | 70 | A-1 | 30 | C-1 | 10 | | |
| Comparative Example 4 | 23.5 | 72 | 4.5 | 98,000 | 1.516 | 70 | A-1 | 30 | C-1 | 13 | | |
| Comparative Example 5 | 23.5 | 72 | 4.5 | 98,000 | 1.516 | 70 | A-1 | 30 | C-1 | 50 | | |
| Comparative Example 6 | 23.5 | 72 | 4.5 | 98,000 | 1.516 | 70 | A-1 | 30 | | | D-1 | 25 |
| Comparative Example 7 | 23.5 | 72 | 4.5 | 98,000 | 1.516 | 70 | A-1 | 30 | | | D-2 | 25 |
| Comparative Example 8 | 23.5 | 72 | 4.5 | 98,000 | 1.516 | 70 | A-1 | 30 | | | D-3 | 25 |
| Comparative Example 9 | 20 | 55 | 25 | 98,000 | 1.516 | 70 | A-1 | 30 | | | D-3 | 1000 |

Amount blended*: Amount blended with respect to 100 parts by mass of the total of the graft copolymer (A) and the vinyl-based copolymer (B)

TABLE 3

| | Transparency | | Color tone YI value | Impact resistance Charpy impact strength (kJ/m$^2$) | Flowability Melt flow rate (g/10 min) | Mold deposition |
|---|---|---|---|---|---|---|
| | Haze (%) | Total light transmittance (%) | | | | |
| Example 1 | 3 | 89 | 6 | 12.3 | 23.4 | ○ |
| Example 2 | 3.2 | 88.8 | 6 | 12.5 | 23.3 | ○ |
| Example 3 | 3.4 | 88.6 | 6 | 12.6 | 23.3 | ○ |
| Example 4 | 3.5 | 88.4 | 7 | 12.5 | 23.2 | ○ |
| Example 5 | 3.6 | 87.8 | 8 | 12.6 | 23.1 | ○ |
| Example 6 | 3 | 89.1 | 6 | 12.3 | 23.2 | ○ |
| Example 7 | 2.8 | 89.4 | 5 | 11.2 | 23.2 | ○ |
| Example 8 | 3 | 89 | 6 | 12.2 | 23.3 | ○ |

TABLE 3-continued

| | Transparency | | | Impact resistance | Flowability | |
| --- | --- | --- | --- | --- | --- | --- |
| | Haze (%) | Total light transmittance (%) | Color tone YI value | Charpy impact strength (kJ/m$^2$) | Melt flow rate (g/10 min) | Mold deposition |
| Example 9 | 3 | 89 | 6 | 12.3 | 23.3 | ○ |
| Comparative Example 1 | 2.6 | 89.4 | 8 | 10.1 | 21 | ○ |
| Comparative Example 2 | 2.4 | 89.7 | 7 | 8.7 | 21.2 | ○ |
| Comparative Example 3 | 2.8 | 89.2 | 6 | 10.5 | 21.8 | ○ |
| Comparative Example 4 | 2.8 | 89.2 | 6 | 10.6 | 22.3 | ○ |
| Comparative Example 5 | 4.5 | 87 | 6 | 12.6 | 23.4 | x |
| Comparative Example 6 | 3.1 | 89.1 | 6 | 12.4 | 20.5 | Δ |
| Comparative Example 7 | 3.1 | 89.2 | 6 | 12.4 | 20.3 | Δ |
| Comparative Example 8 | 2.7 | 89.4 | 6 | 10.3 | 20.1 | Δ |
| Comparative Example 9 | 2.9 | 89.3 | 6 | 10.9 | 23 | x |

As seen in the evaluation results in Examples 1 to 9, a transparent thermoplastic resin composition makes it possible to obtain a transparent thermoplastic resin composition and a molded article of the composition, wherein the composition has excellent impact resistance and flowability, also has a high transparency and good color tone, and further has good mold deposition.

On the other hand, Comparative Examples 1 and 2 did not include the polydimethyl siloxane gum (C), and exhibited poor impact resistance and flowability. Comparative Examples 3 and 4 included less than 15 ppm of the polydimethyl siloxane gum (C), and thus, exhibited poor impact resistance and flowability. Comparative Example 5 included more than 40 ppm of the polydimethyl siloxane gum (C), and thus, exhibited poor transparency and mold deposition. In Comparative Examples 6 and 7, the liquid silicone compound (D) (polydimethyl siloxane oil) the polydimethyl siloxane of which had a weight-average molecular weight of less than 300,000 was used in place of the polydimethyl siloxane gum (C), and thus, the Comparative Examples exhibited poor flowability and mold deposition. In Comparative Example 8, the liquid silicone compound (D) (modified silicone oil) was used in place of the polydimethyl siloxane gum (C), and thus, the Comparative Example exhibited excellent transparency, but exhibited poor impact resistance, flowability, and mold deposition. In Comparative Example 9, the liquid silicone compound (D) (modified silicone oil) was used in place of the polydimethyl siloxane gum (C), and the content was more than 40 ppm. Thus, the Comparative Example exhibited excellent transparency, but exhibited poor impact resistance and mold deposition.

Figure 3:
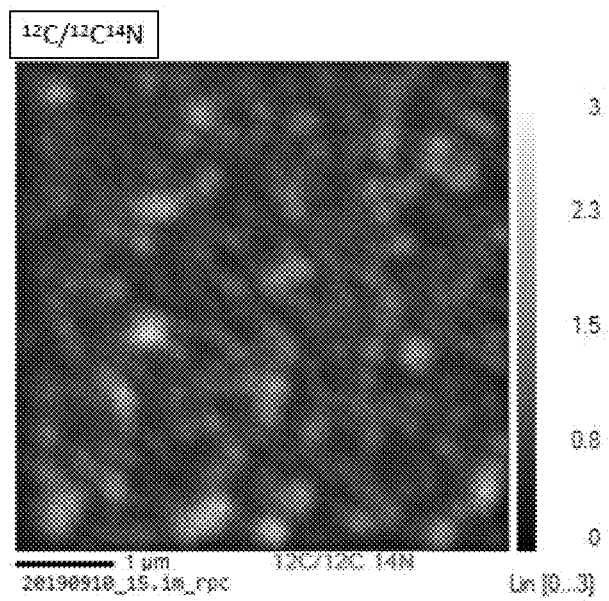
FIG. 3 is a [$^{12}C/^{12}C^{14}N$] image of the resin composition in Example 2.
Figure 4:
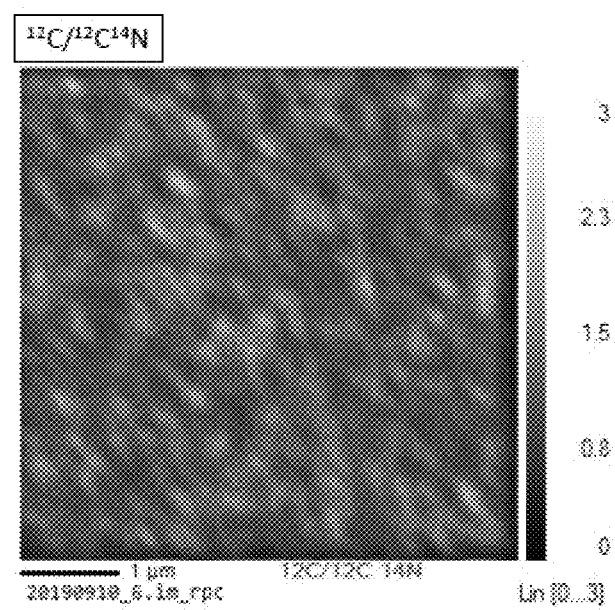
FIG. 4 is a [$^{12}C/^{12}C^{14}N$] image of the resin composition in Comparative Example 1.
Figure 5:
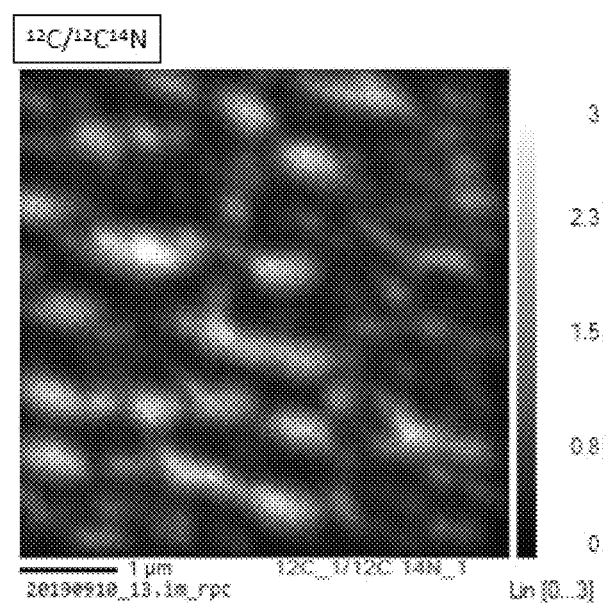
FIG. 5 is a [$^{12}C/^{12}C^{14}N$] image of the resin composition in Comparative Example 7.

FIGS. 3, 4, and 5 illustrate the [$^{12}$C/$^{12}$C$^{14}$N] images of Example 2, Comparative Example 1, and Comparative Example 7 respectively. The right bar is graduated according to intensity (the intensity is higher toward 3, and the intensity is lower toward 0). In the low intensity region, the existence amount of the methyl methacrylate/acrylonitrile/styrene copolymer is large, and the intensity is higher as the existence amount of rubber increases. That is, the intensity represents the dispersion state of the rubber (in other words, the degree of localization).

FIG. 3 demonstrates that the rubber is localized to a suitable degree, and such a resin composition has excellent impact resistance and flowability. On the other hand, FIG. 4 demonstrates that the rubber is localized to a low degree, and such a resin composition has poor impact resistance. In FIG. 5, the rubber is localized to a very high degree, and such a resin composition has poor flowability.

INDUSTRIAL APPLICABILITY

A transparent thermoplastic resin composition and a molded article can be widely used in applications such as home electric appliances, communication devices, general merchandise, and medical devices.

The invention claimed is:
1. A transparent thermoplastic resin composition comprising:
  100 parts by mass of a transparent thermoplastic resin composition composed of
    10 to 60 parts by mass of a graft copolymer (A) obtained by graft-copolymerizing a monomer mixture (a) containing at least an aromatic vinyl-based monomer (a1) and a (meth)acrylic acid ester-based monomer (a2) in the presence of a rubbery polymer (r), and
    40 to 90 parts by mass of a vinyl-based copolymer (B) obtained by copolymerizing a monomer mixture (b) containing at least an aromatic vinyl-based monomer (b1), a (meth)acrylic acid ester-based monomer (b2), and a vinyl cyanide-based monomer (b3); and
  15 ppm or more and 40 ppm or less of a polydimethyl siloxane gum (C) having a weight-average molecular weight of 300,000 or more.
2. The transparent thermoplastic resin composition according to claim 1, wherein said rubbery polymer (r) is polybutadiene.
3. The transparent thermoplastic resin composition according to claim 1, wherein said rubbery polymer (r) has a mass-average particle diameter of 0.15 to 0.4 μm.
4. A method of producing a transparent thermoplastic resin composition comprising:

obtaining a graft copolymer (A) by graft-copolymerizing a monomer mixture (a) containing at least an aromatic vinyl-based monomer (a1) and a (meth)acrylic acid ester-based monomer (a2) in the presence of a rubbery polymer (r);

obtaining a vinyl-based copolymer (B) by copolymerizing a monomer mixture (b) containing at least an aromatic vinyl-based monomer (b1), a (meth)acrylic acid ester-based monomer (b2), and a vinyl cyanide-based monomer (b3); and mixing at least said graft copolymer (A), said vinyl-based copolymer (B), and a polydimethyl siloxane gum (C) having a weight-average molecular weight of 300,000 or more;

wherein said transparent thermoplastic resin composition contains:

100 parts by mass of a transparent thermoplastic resin composition composed of 10 to 60 parts by mass of said graft copolymer (A) and 40 to 90 parts by mass of said vinyl-based copolymer (B); and 15 ppm or more and 40 ppm or less of said polydimethyl siloxane gum (C).

5. A method of producing a transparent thermoplastic resin composition, comprising:

obtaining a polydimethyl siloxane gum (C)-containing graft copolymer (A') by graft-copolymerizing a monomer mixture (a) containing at least an aromatic vinyl-based monomer (a1) and a (meth)acrylic acid ester-based monomer (a2) in the presence of a rubbery polymer (r) and a polydimethyl siloxane gum (C) having a weight-average molecular weight of 300,000 or more;

obtaining a vinyl-based copolymer (B) by copolymerizing a monomer mixture (b) containing at least an aromatic vinyl-based monomer (b1), a (meth)acrylic acid ester-based monomer (b2), and a vinyl cyanide-based monomer (b3); and mixing at least said polydimethyl siloxane gum (C)-containing graft copolymer (A') and said vinyl-based copolymer (B);

wherein said transparent thermoplastic resin composition includes 15 ppm or more and 40 ppm or less of said polydimethyl siloxane gum (C) with respect to 100 parts by mass of a transparent thermoplastic resin composition composed of 10 to 60 parts by mass of said graft copolymer (A) contained in said polydimethyl siloxane gum (C)-containing graft copolymer (A') and 40 to 90 parts by mass of said vinyl-based copolymer (B).

6. A molded article composed of said transparent thermoplastic resin composition according to claim 1.

7. A method of producing a molded article, comprising:

producing a transparent thermoplastic resin composition by the production method according to claim 4; and molding the resulting transparent thermoplastic resin composition.

* * * * *